United States Patent
Lavin et al.

(10) Patent No.: US 8,201,413 B2
(45) Date of Patent: Jun. 19, 2012

(54) SEAL LAND WITH AIR INJECTION FOR CAVITY PURGING

(75) Inventors: Jeffrey R. Lavin, East Hartford, CT (US); Michael J. Murphy, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 1009 days.

(21) Appl. No.: 11/491,891

(22) Filed: Jul. 24, 2006

(65) Prior Publication Data

US 2008/0016871 A1  Jan. 24, 2008

(51) Int. Cl.
*F02K 3/10* (2006.01)
(52) U.S. Cl. .......................................... 60/766
(58) Field of Classification Search ............ 60/761, 60/762, 766, 266; 239/265.11, 265.17
See application file for complete search history.

(56) References Cited

U.S. PATENT DOCUMENTS

| | | | |
|---|---|---|---|
| 3,972,475 A * | 8/1976 | Nelson et al. ............... 239/127.3 |
| 4,109,864 A | 8/1978 | Clayton | |
| 4,271,666 A * | 6/1981 | Hurley et al. ................ 60/226.1 |
| 4,805,398 A | 2/1989 | Jourdain et al. | |
| 4,864,818 A * | 9/1989 | Taylor ............................. 60/766 |
| 5,435,127 A * | 7/1995 | Luffy et al. ..................... 60/204 |
| 5,470,198 A | 11/1995 | Harrogate et al. | |
| 5,996,936 A * | 12/1999 | Mueller ...................... 244/53 R |
| 6,295,805 B1 * | 10/2001 | Lackey et al. ................... 60/204 |
| 7,377,099 B2 * | 5/2008 | Cowan et al. ................... 60/230 |
| 2005/0161527 A1 * | 7/2005 | Murphy et al. ............... 239/128 |
| 2006/0179816 A1 * | 8/2006 | Murphy et al. ................ 60/39.5 |

FOREIGN PATENT DOCUMENTS

| | | |
|---|---|---|
| EP | 1156280 A2 | 11/2001 |
| EP | 1691064 A2 | 8/2006 |
| WO | 02/27148 A1 | 4/2002 |

OTHER PUBLICATIONS

Extended European Search Report mailed on Jan. 21, 2011 for EP Application No. 07252042.2.

* cited by examiner

*Primary Examiner* — Louis Casaregola
*Assistant Examiner* — Phutthiwat Wongwian
(74) *Attorney, Agent, or Firm* — Carlson, Gaskey & Olds, P.C.

(57) ABSTRACT

An exhaust liner assembly including an interface between moveable parts includes a seal liner having a plurality of slots. The size of each slot varies with the circumferential position of the liner assembly to provide a stable cavity pressure within the interface to create a stable barrier about the entire circumference of the exhaust liner assembly.

20 Claims, 5 Drawing Sheets

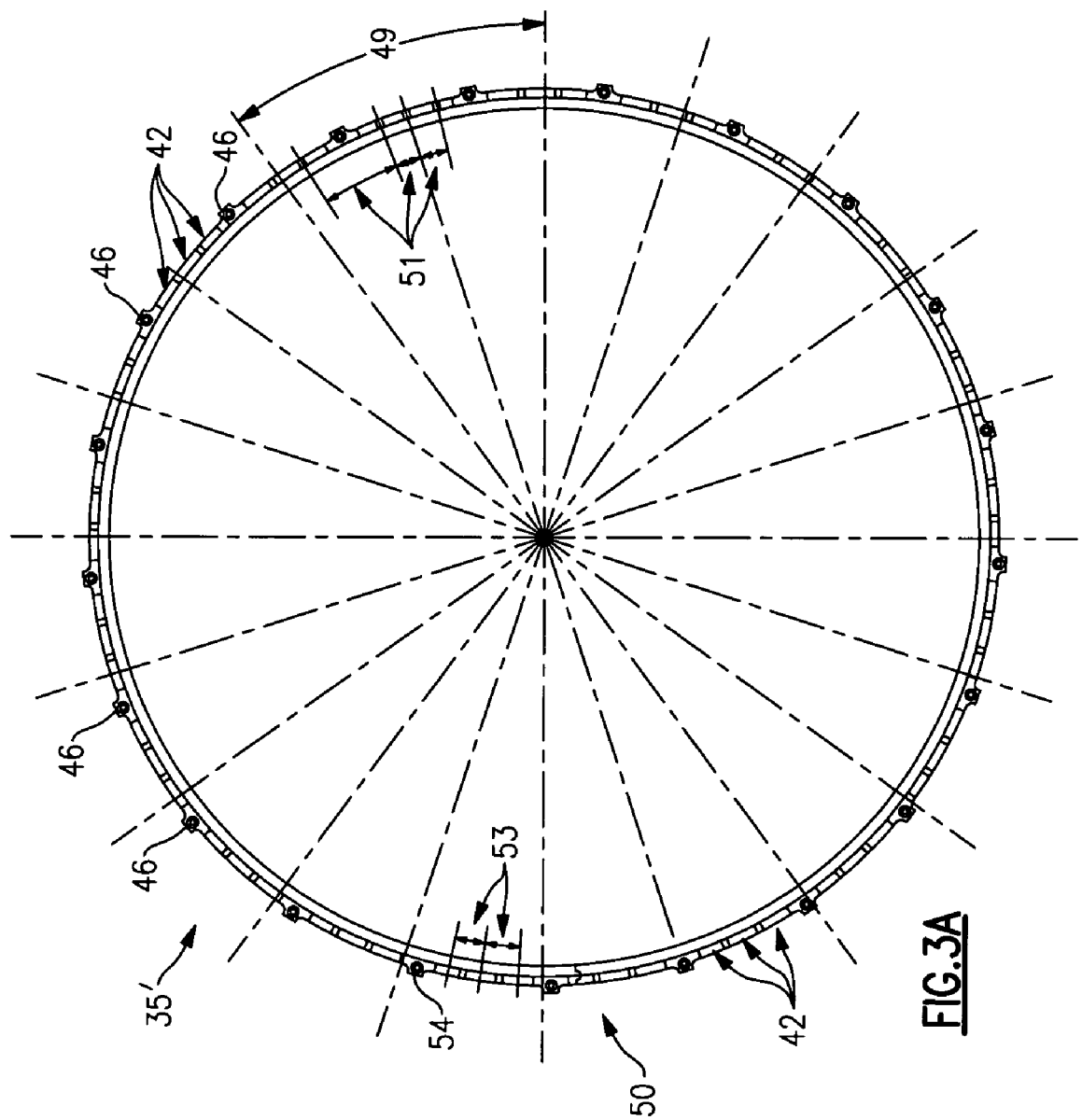

SEAL LAND WITH AIR INJECTION FOR CAVITY PURGING

This invention was made with government support under Contract No. N00019-02-C-3003 with the United States Navy. The government therefore has certain rights in this invention.

BACKGROUND OF THE INVENTION

This invention generally relates to an interface between liner components. More particularly, this invention relates to a device for introducing air into an interface between liner components.

An exhaust liner assembly for a gas turbine engine includes liner components that shield engine and other components from hot core exhaust gases. Liner assemblies include features to accommodate thermal growth, provide desired aerodynamic properties as well as address other desired performance parameters. These considerations and features can be counter to the main purpose of the liner of isolating the extreme temperatures of the hot core gases from other engine components. For this reason, conventional liner assemblies utilize by-pass air in specific areas of the liner particularly susceptible to impingement of hot core gases.

Further, some conventional liner assemblies can include cavities that are open to the hot core gases. The cavities result and are included to facilitate various desired features of the liner assembly such as relative movement between liner parts, thermal growth and to provide desired aerodynamic properties, for example. In such instances it is known to supply relatively cool by-pass air into these cavities to create a pressure of such a magnitude as to prevent intrusion of hot gases into that cavity.

Disadvantageously, in many instances the magnitude of by-pass flow required to generate the desired pressure barrier incurs undesirable performance restrictions. The amount of by-pass flow required to generate the pressure barrier for the cavity has a direct negative impact on overall engine performance.

Accordingly, it is desirable to develop a system for generating pressure barriers for cavities within the exhaust liner that reduces the overall impact to the gas turbine engine assembly.

SUMMARY OF THE INVENTION

An example liner assembly includes an interface having a passage for cooling air. The passage for cooling air comprises slots of varying size that tailor airflow to provide a desired air pressure within an interface that substantially prevents intrusion of hot core gases.

The example liner assembly includes an interface between moveable parts of an exhaust liner. The exhaust liner includes a first part that moves relative to a second part. Each moveable part of the exhaust liner includes a liner assembly that provides an inner surface that is in contact with hot core gases. The interface between the two moveable liner assemblies creates a cavity within which it is desired to prevent the flow of hot gasses. Cool bypass air is routed into this interface to substantially prevent the intrusion of hot gasses by creating a barrier that stops the penetration of hot core gases.

The configuration of the interface requires that there be a radial step along the inner surface between the two moveable liner assemblies. This radial height of this step varies circumferentially around the exhaust liner. The pressure of cooling air required around the exhaust liner interface varies with the circumferential position of the radial step. As the radial step varies about the circumference of the exhaust liner so does the required air flow that is required to provide the desired pressure within the interface to prevent the infusion of hot gases. The different pressures required to provide the desired barrier to hot core cases are provided by metering airflow through slots that vary in size about the circumference of the exhaust liner. Varying airflow so that only the airflow required providing the desired pressures in the interface reduces the overall consumption of by-pass cooling air. As a radial step increases and decreases so does the airflow into that interface cavity at that radial location. In this way cooling air can be conserved such that only that amount of cooling air required to provide the desired pressure differential and barrier to hot core gases is injected into the cavity at any given circumferential position.

Accordingly, the example liner assembly includes a slot that varies in size relative to a circumferential position about the exhaust liner and corresponds with the radial distance between the two liner assemblies to accommodate localized deviations in air flow required to create the desired barrier to hot combustion gasses.

These and other features of the present invention can be best understood from the following specification and drawings, the following of which is a brief description.

BRIEF DESCRIPTION OF THE DRAWINGS

FIG. 3A is another rear view of another example seal land assembly.

DETAILED DESCRIPTION OF THE PREFERRED EMBODIMENT

Figure 1:
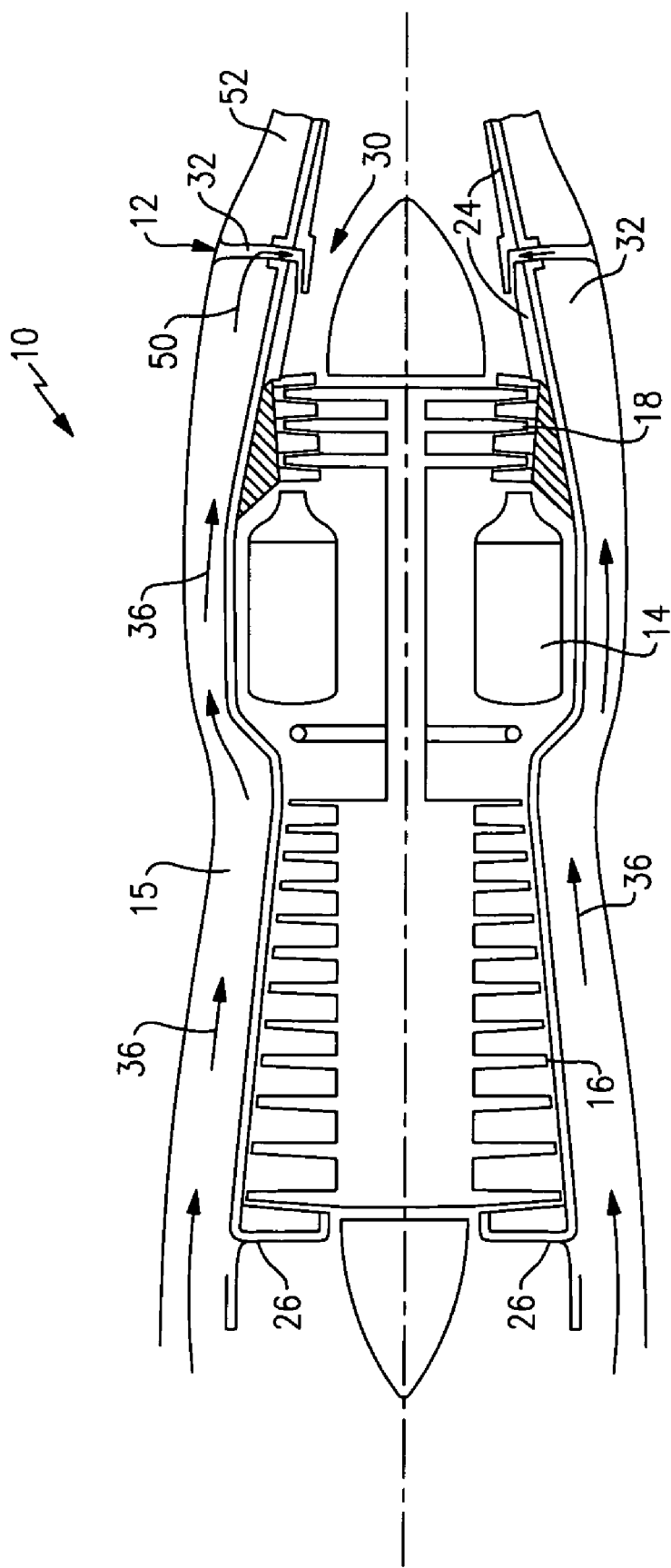
FIG. 1 is a schematic illustration of an example aircraft engine assembly.

Referring to FIG. 1, an example engine assembly 10 includes an exhaust liner assembly 12. The exhaust liner assembly 12 includes an interface 30 to provide for movement of the exhaust liner 12. The engine assembly 10 is disposed within a housing 15 that includes an inner surface 26. Air enters the engine assembly 10 into a compression module 16. Compressed air from the compression module 16 is injected into a combustion module 14. In the combustion module 14, compressed air is mixed with gas and ignited to create hot core exhaust gases that are driven past a turbine module 18. Rotation of the turbine module 18 drives the compressor module 14.

Hot core exhaust gas is exhausted through an exhaust duct assembly, schematically indicated at 12. The example exhaust duct assembly 12 includes a liner assembly 24 that defines an inner surface of the exhaust duct assembly. The example exhaust duct assembly 12 includes a first portion 50 and a second portion 52 that is movable relative to the first portion 50. An interface 30 between the first portion and the second portion 52 includes a cavity 32. The cavity 32 is injected with air that is by-passed around the compression module 16 to prevent the hot core exhaust gases from impinging into the interface 30.

As should be appreciated, the engine assembly 10 illustrated is by way of example only and other engine assemblies or moveable duct assemblies requiring a liner will benefit from the disclosures of the invention.

Figure 2:
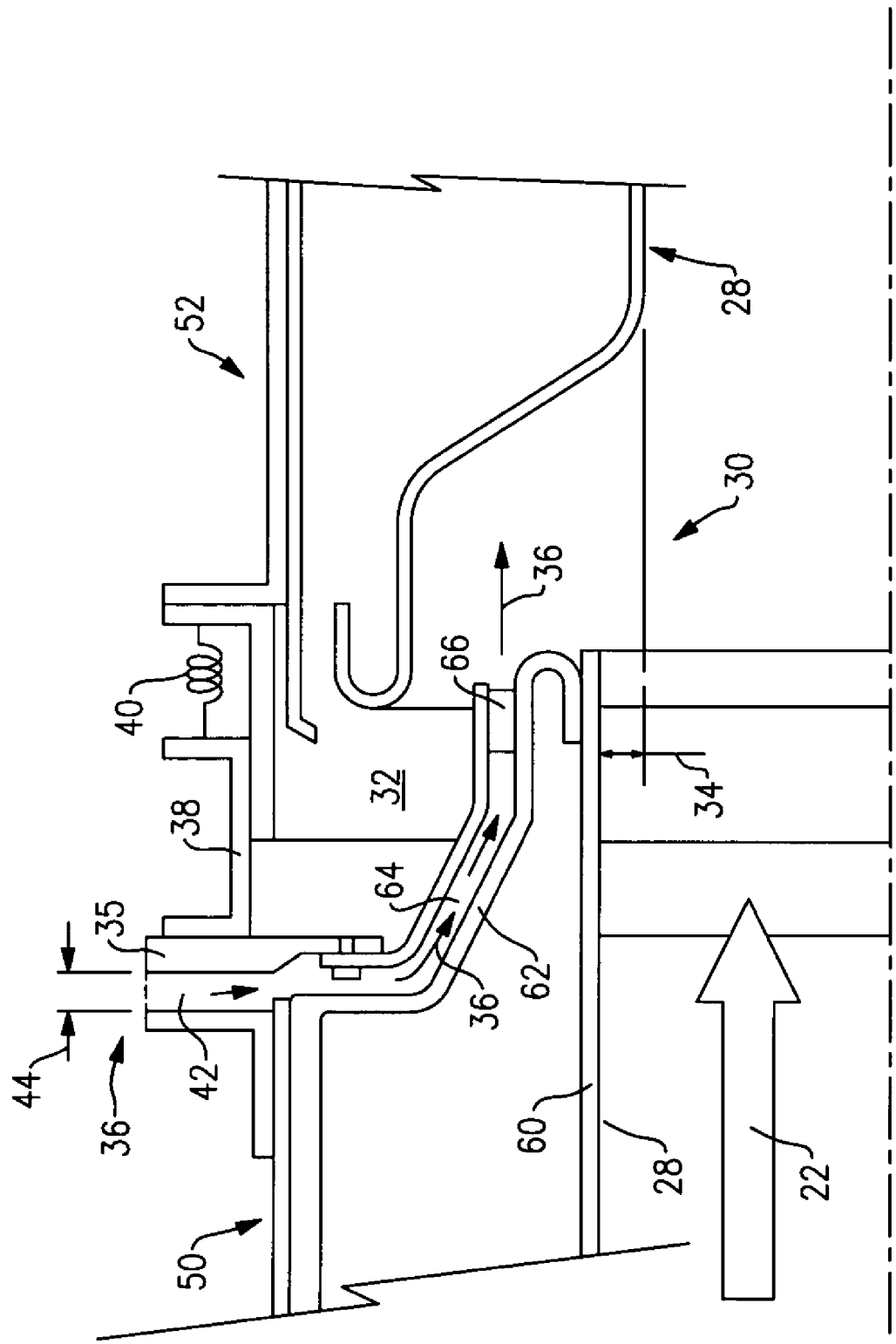
FIG. 2 is a cross-sectional view of an example liner assembly interface according to this invention.

Referring to FIG. 2, the interface 30 of the exhaust liner assembly 12 includes the first portion 50 and the second portion 52. The first portion 50 in the example exhaust liner assembly 12 is stationary. The second portion 52 is moveable relative to the first portion 50. Movement between the first portion 50 and the second portion 52 is facilitated by a gap between the two portions 50, 52 that is filled with the cooling air 36.

The inner surface 28 of the first portion 50 is disposed at a different radial position relative to the inner surface 28 of the second portion 52. These different radial positions result in a radial distance 34 between the two inner surfaces 28. This radial distance 34 varies about the circumference of the exhaust duct assembly 12.

The second portion 52 includes a U-seal 38 that is biased against a seal land 35 by a biasing member 40. The interface between the U-seal 38 and the seal land 35 is biased by the biasing member 40 to accommodate thermal growth and movement between the first portion 50 and the second portion 52. Movement between the first portion 50 and the second portion 52 is facilitated by a cavity 32 of the interface 30. Cooling air flow 36 is injected into the cavity 32 at a rate determined to provide a desired pressure within the cavity 32 that prevents the intrusion of hot core gases 22.

The seal land 35 includes a slot 42 through which cooling air 36 flows. This slot 42 supplies cooling air 36 into a finger seal injection guide 62 that defines a flow path 64 for the cooling air 36. This flow path 64 is defined between a flow path inner liner 60 and the finger seal injection guide 62. The end portion of the finger seal injection guide 62 is held at a desired opening by a spacer 66.

The slot 42 includes a width 44 that corresponds with the specific radial distance 34 between the inner surfaces 28. As appreciated, the variation of the radial distance about the circumference of the exhaust liner assembly 12 results in a varying flow out of the cavity 32. The differing air flow out of the cavity 32 in turn, results in differing pressures within the cavity 32.

Conventional accommodation of this variation includes merely injecting cooling air at a sufficient rate to accommodate the cavity and radial distance 34 of the greatest distance thereby providing excessive air flow for some circumferential locations and just enough at other locations. As appreciated, this solution results in the inefficient use of a majority of cooling bypass air.

The example seal land 35 includes the slots 42 that vary in size about the circumference of the exhaust liner assembly 12 to tailor air flow 36 to accommodate the localized pressure within the cavity 32 to generate the barrier pressure to the hot core gasses 22.

Figure 3:
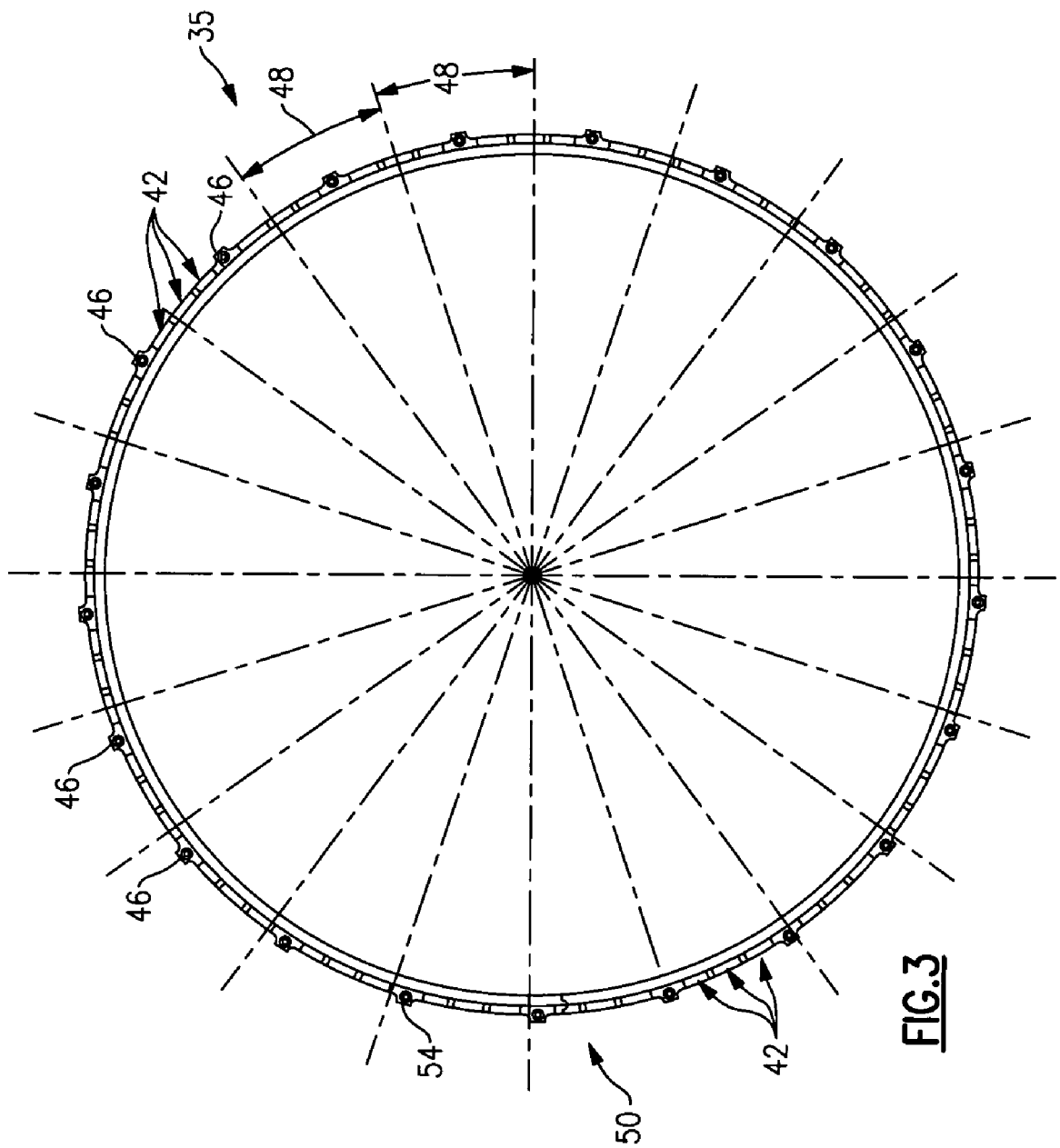
FIG. 3 is a rear view of the seal land assembly.

Referring to FIG. 3 with continuing reference to FIG. 2, the seal land 35 is shown and includes a plurality of the slots 42 disposed circumferentially. Between the slots 42 are fastener lands 46. The fastener lands 46 provide a flange surface for attachment of the seal land 35 to the liner portion 50.

The size of the seal slots 42 vary according to the specific circumferential location within the seal land 35. In the example seal land 35 the slot width 44 varies every approximately 18 degrees as illustrated at 48. The angular variation is related to the variation in the radial distance 34 about the circumference of the exhaust liner assembly 12. The slots 42 vary in width 44 for each angular section 48 about the entire circumference of the seal land 35. The variation in slot size customizes and varies the cooling air flow 36 into the circumferential cavity 32 to accommodate and provide the desired pressure to prevent impingement of the hot core gases 22.

Referring to FIG. 3A, another example seal land 35' includes a plurality of openings 42 that are the same size, but are grouped non-uniformly about the circumference of the seal land 35'. In this way a common size opening can be utilized in desired densities to provide the desired variation of airflow through the seal land 35' in a specific circumferential sector. In the example seal land 35' a sector 49 includes a plurality of slots 42 that are spaced a circumferential length 51 apart. This spacing of slots provides a desired airflow for that specific circumferential area. In contrast, another sector includes slots 42 spaced a circumferential distance 53 apart to provide a different airflow as is desired for that particular circumferential location.

Figure 4:
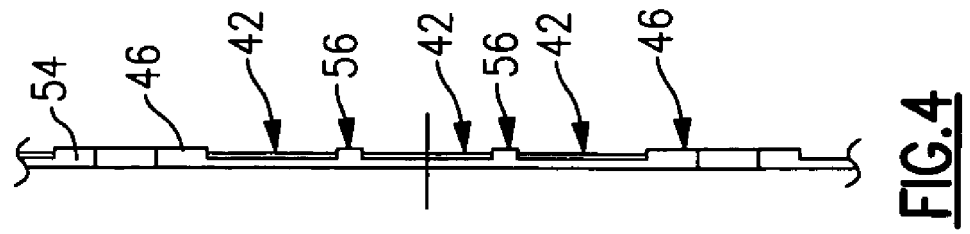
FIG. 4 is a cross-sectional view with a portion of the example seal land assembly.

Referring to FIG. 4, an enlarged cross-sectional view of a portion of several slots 42 disposed between flange members 54 is shown. Each flange member 54 is to provide for the attachment by way of a fastener to the fastener lands 46. Also disposed between the fastener lands 46 is a step flange 56 to accommodate and provide a bearing surface between the fastener lands 46 to provide a desired sealing and contact surface.

Figure 5:
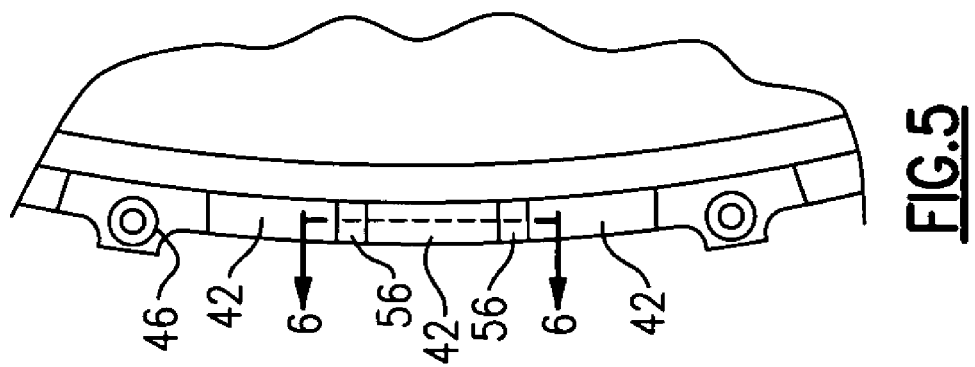
FIG. 5 is an enlarged view of a portion of the example seal land assembly.

Referring to FIG. 5, an enlarged view of a section between the fastener lands 46 is illustrated with the step flanges 56. The step flanges 56 are of such a length and depth required to provide the desired cooling air flow through the slots 42 that in turn provides the desired pressurization of the cavity 32 of the interface 30.

Figure 6:
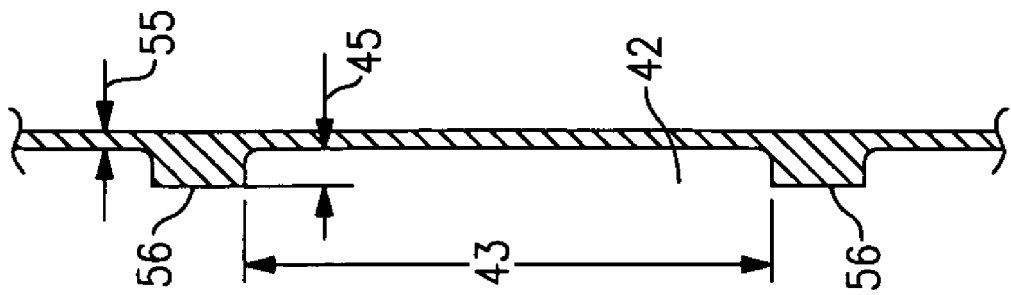
FIG. 6 is another enlarged view of a slot disposed within the example seal land assembly.

Referring to FIG. 6, a still greater enlarged view is shown of the slot 42 disposed between two step flanges 56 that provides support of the seal land at various circumferential locations. The size of the slot 42 includes a width 43 and a depth 45. A thickness 55 in the slot 42 varies dependent on a circumferential position on the seal land 35. Variation of the thickness provides a variation in the depth 45 from the top of the step flange 56 and a corresponding fastener land 46 that is utilized to tailor airflow into each circumferential location of the seal land 35. Further, the variation of the thickness 55 changes the depth 45, but does not change an overall thickness 57 of the seal land 35. The overall thickness of the seal land 35 is maintained about the circumference to provide a desired constant mounting surface and sealing surface for the U-seal 38. Although the example seal land 35 varies the thickness 55, other dimensions, such as the width 43 could be varied to provide the desired slot size required to provide the desired airflow into the interface 30.

Accordingly, the exhaust liner assembly interface according to this invention provides for the stable maintenance of cavity pressure that generates the desired results of providing a barrier to hot core gasses.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A liner assembly comprising:
   a gap between at least two portions of the liner assembly, each of the at least two portions of the liner assembly define an interior surface exposed to hot exhaust gas flow; and a seal land disposed between the at least two portion of the liner assembly, the seal land including a plurality of inlets that supply an airflow into the gap, wherein the plurality of inlets vary in size to provide the airflow into the gap that varies dependent on a circumferential position to provide a circumferentially varying flow field into the gap.

2. The assembly as recited in claim 1, wherein the plurality of inlets comprises at least one of inlet of a different size than at least one other of the plurality of inlets.

3. The assembly as recited in claim 1, wherein the gap comprises a cavity disposed between the at least two portions of the liner assembly.

4. The assembly as recited in claim 1, wherein the gap is disposed about an inner periphery of the liner assembly, and the airflow varies with a circumferential position of the opening along the inner periphery.

5. The assembly as recited in claim 1, wherein the gap comprises a cavity disposed circumferentially about the hot core gas flow.

6. The assembly as recited in claim 1, wherein the at least two portions of the liner assembly that define the inner surface of the liner assembly, are spaced a radial distance apart from each other.

7. The assembly as recited in claim 6, wherein the radial distance between the at least two portions varies along the gap, and the size of each of the plurality of inlets varies selectively responsive to variation in the radial distance.

8. The assembly as recited in claim 7, wherein the gap is circumferential and the size of the plurality of inlets varies over a circumferential length of the gap.

9. The assembly as recited in claim 8, wherein the circumferential length comprise a length providing between 15 and 20 degrees of the circumference of the liner assembly.

10. The assembly as recited in claim 7, wherein the gap is circumferential and the number of the plurality of openings varies about a circumferential length of the interface.

11. An exhaust liner assembly comprising:
a least two liner components defining an inner duct surface for directing a flow of core gases;
an axial gap between the at least two liner components disposed about the inner duct surface;
a plurality of openings disposed about the inner duct for supplying air flow into the axial gap at a corresponding plurality of circumferential locations, wherein the plurality of openings provide an airflow that varies depending on the circumferential location of the opening for varying airflow into the axial gap.

12. The assembly as recited in claim 11, wherein the plurality of openings vary in size at least two of the plurality of circumferential locations about the axial gap for controlling airflow into the axial gap.

13. The assembly as recited in claim 11, wherein the circumferential locations of the plurality of openings are grouped unequally about the axial gap for controlling airflow into the axial gap.

14. The assembly as recited in claim 12, wherein the at least two liner components are spaced apart a radial distance along the inner duct surface, wherein the radial distance varies about the inner duct surface, and the size of each of the plurality of openings is related to the radial distance between the at least two liner components.

15. The assembly as recited in claim 11, wherein the at least two liner components are movable relative to each other.

16. The assembly as recited in claim 11, wherein the at least two liner components are fixed relative to each other.

17. The assembly as recited in claim 12, wherein the axial gap comprises a cavity, wherein the cavity comprises the plurality of openings for supplying air into the cavity, and an outlet in communication with the hot core gases.

18. The assembly as recited in claim 17, wherein the size of the plurality of openings varies to provide a desired pressure within the cavity that varies depending on the circumferential location.

19. The assembly as recited in claim 17, wherein the pressure desired within the cavity varies in relation to spaced apart radial distance between the at least two liner components.

20. The assembly as recited in claim 17, wherein the desired pressure is determined to prevent the flow of hot core gases into the axial gap.

* * * * *